April 3, 1962 F. COURTOIS 3,027,812
MACHINE TOOL COMPRISING A TOOL-HOLDER SPINDLE PROVIDED WITH
A CENTERING CONE AND A DEVICE FOR CLAMPING INTO
POSITION AND FOR EXTRACTING SAID TOOL
Filed Sept. 30, 1957 2 Sheets-Sheet 2

INVENTOR
FRANCIS COURTOIS
By Irwin S. Thompson
ATTY.

3,027,812
MACHINE TOOL COMPRISING A TOOL-HOLDER SPINDLE PROVIDED WITH A CENTERING CONE AND A DEVICE FOR CLAMPING INTO POSITION AND FOR EXTRACTING SAID TOOL
Francis Courtois, Geneva, Switzerland, assignor to Societe Genevoise d'Instruments de Physique, Geneva, Switzerland, a corporation of Switzerland
Filed Sept. 30, 1957, Ser. No. 687,163
Claims priority, application Switzerland Nov. 12, 1956
5 Claims. (Cl. 90—11)

The present invention relates to machine tools, especially of the kind which comprise a tool-holder spindle provided with a device for the rapid fixing and extraction of a tool.

Machine tools are known which comprise a tool-holder spindle provided with a device for the rapid fixing and extraction of a tool. The tool is generally fast with a tool holder comprising a centering cone and a threaded shank, while the spindle is provided with a clamping member comprising a screwthread which engages with the screw-thread of the tool holder and exerts a tractive effect on the latter, in order to clamp the cone of the tool holder within a corresponding cone formed in the end of the spindle. An actuating rod coaxial with the spindle and displaceable axially and angularly relatively thereto, permits the actuation of the said clamping member with a view to clamping and liberating the tool. This actuating rod is generally driven rotationally by an electric motor.

This method of rapid fixing of tools is at present highly esteemed but has the disadvantage, especially when a tool weighing several kilograms has to be mounted, that the operator has to hold this tool in the cone of the spindle by means of one hand while he uses his other hand to operate the rod for actuating the spindle, for example by operating a switch arranged in the feed circuit of the motor driving the said rod. It follows that the operator is not always capable of holding the tool coaxially to the spindle, so that the tool may become defectively centered when it is clamped in the centering cone of the spindle.

According to the present invention there is provided a machine tool which comprises a tool-holder spindle having a centering cone and device for clamping into position and for extracting the tool, said device comprising a clamping rod coaxially arranged within an axially bored portion of the spindle, the clamping rod being displaceable axially and angularly within the spindle, and a reversible driving motor which imparts a rotational movement to the clamping rod in one direction to clamp the tool and a rotational movement in the opposite direction to extract the tool, characterized in that the clamping rod also constitutes a control member for automatically starting up the driving motor when the rear portion of the tool-holder is presented and engaged inside the centering cone of the spindle.

A preferred form of this invention will now be described and illustrated without limiting its scope by the accompanying drawings wherein.

Figure 1:
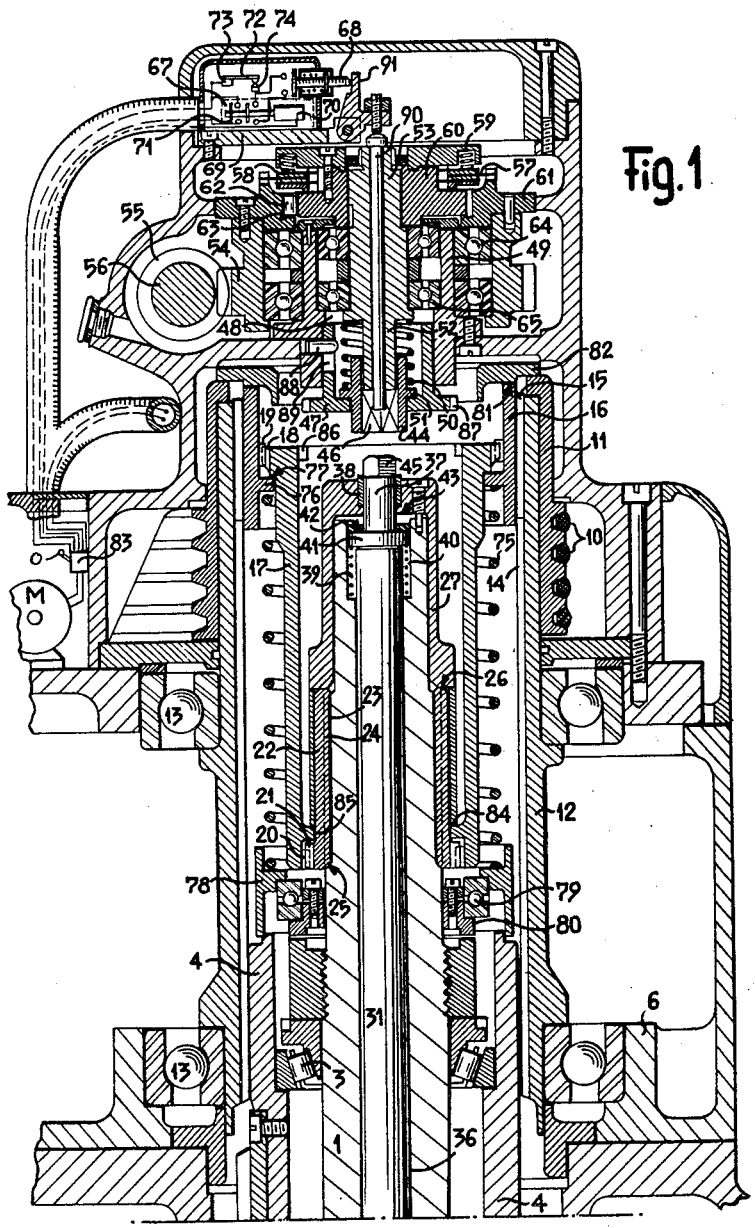
FIG. 1 is an axial sectional view of the upper part of the tool-holder spindle.
Figure 2:
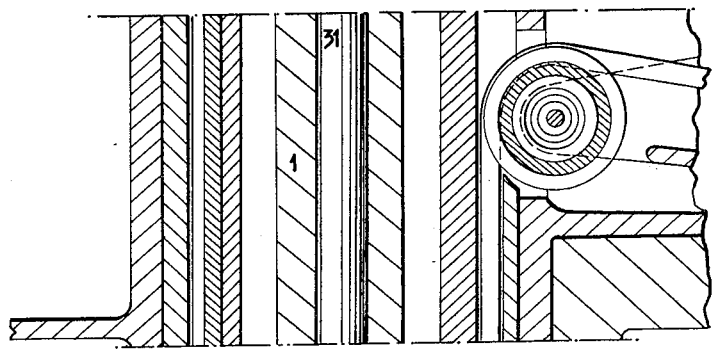
FIG. 2 is an axial sectional view of the lower part of the tool-holder spindle.
Figure 2:
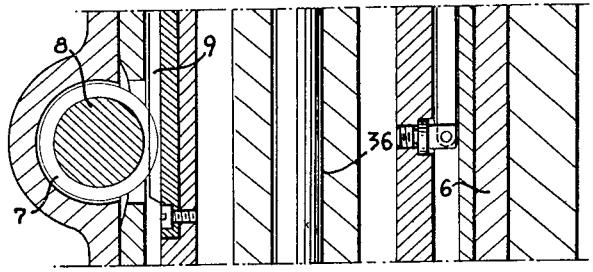

Referring to the accompanying drawings, the tool-holder spindle 1 rotates freely in the roller bearings 2, 3 provided within a sleeve 4 which is displaceable axially in a housing formed in the frame 6 of the machine tool. The axial movements of the sleeve 4 are controlled by a pinion 7 which is fixed rigidly on a shaft 8 and meshes with a rack 9 fast with the sleeve 4. The spindle 1 is driven rotationally by a motor (not shown) connected by trapezoidal belts 10 to a pulley 11 fixed rigidly on a sleeve 12 which rotates freely in ball bearings 13 provided in the frame 6. The sleeve 12 comprises internal splines 14 meshing with external splines 15 of a sleeve 16 which is drawn along in the axial displacement of the spindle 1. This sleeve 16 is connected mechanically to the spindle 1 through the intermediary of a hollow cylinder 17 which comprises on the one hand, external teeth 18 meshing with internal teeth 19 of the sleeve 16 and on the other hand, internal teeth 20 meshing with external teeth 21 of a sleeve 22 provided with internal splines 23 and engaged on a splined portion 24 of the spindle 1. The axial position of this sleeve 22 is determined by a shoulder 25 of the spindle and by the annular front face 26 of a head 27 which is fixed rigidly on the rear end of the spindle 1.

The lower end of the spindle 1 comprises a female centering cone 28 which is designed to receive a male centering cone 29 constituting the shank of the tool-holder 30. This spindle 1 is formed with an axial bore in which is lodged a clamping rod 31 which is displaceable axially and angularly within the spindle. The lower end of this rod 31 is provided with a threaded extension 32 which is adapted to be screwed within a threaded hole 33 which is formed in the rear end of the shank of the tool-holder 30. A shoulder 34 of the rod 31 bears on the corresponding shoulder 35 of the axial bore 36 of the spindle 1 in such a manner as to bring about the clamping of the tool-holder 30 within the spindle by screwing the threaded extension 32 into the threaded hole 33.

The rear end of the rod 31 comprises a journal 37 which is guided in a guide 38 carried by the head 27 fixedly rigidly on the rear end of the spindle 1. The rod 31 is also subjected to the action of a restoring spring 39 bearing against the bottom of a housing 40 and exerting pressure on a collar 41 fast with the rod. The pressure of this spring partially compensates for the weight of the rod 31.

The end 45 of the rod 31 projecting from the guide 38 is of non-circular cross-section and constitutes one of the parts of a coupling whose second part is constituted by a sleeve 44 formed with a hole 46 of corresponding cross-section. This sleeve 44 turns freely in an axial hole in a support 47 engaged in a housing 48 formed in a sleeve 49 fixed rigidly on the frame 6. A spring 50 tends to hold the sleeve 44 in the axial position illustrated in the drawings and determined by a collar 51 which bears on the support 47. The rear end of the sleeve 44 is engaged freely on an extension 52 of a driving element 53 and which has a non-circular cross-section corresponding to the cross-section of the hole 46 in the said sleeve.

The driving element 53 is connected, on the one hand, by a friction coupling and, on the other hand, by an unidirectional-drive coupling, to a worm wheel 54 meshing with a worm 55, which is fixed rigidly on a driving shaft 56.

The friciton coupling is constituted by discs 57, 58 which are made to bear against one another by springs 59, one set of discs being fast with a plate 60 keyed on the driving element 53 while the other set is fast with a ring 61 fixed rigidly on the worm wheel 54.

The unidirectional drive coupling comprises wedging members 62 which are arranged in the housings 63 which are formed partly in the plate 60 and partly in the ring 61.

The driving element 53 and the worm wheel 54 are freely pivotable with respect to the sleeve 49 through the agency of ball bearings 64 and 65. The driving shaft 56 is connected mechanically to an electric motor M whose starting is controlled by a control device comprising an electromagnetic contact-maker 67, the supply of current to whose exciting winding 70 is controlled by a push button 68. The movable armature of the contact-maker carries on the one hand, contacts 71 which are inserted in the feed circuit of the motor M and, on the other hand, a holding contact 69 which is connected in series with a time switch in the circuit feeding the exciting winding 70 of the contact-maker. The time switch is constituted by a bimetallic strip 72 whose foot is fixed rigidly on a contact stud 73 while its free end rests, when the blade 72 is at room temperature on a contact stud 74.

The machine tool which has been described operates in the following manner:

When the motor for driving the spindle is supplied with current, it drives the spindle 1 rotationally through the pulley 11, the sleeve 16, the hollow cylinder 17 and the sleeve 22. The spindle, which then rotates freely in the bearings 2 and 3 is displaceable axially by actuating the sleeve 4 by means of the shaft 8. The spindle can be rotated in all the axial positions of the sleeve 4, due to the sleeve 16 the external splines 15 of which slide in the internal splines 14 of the sleeve 12 carrying the pulley 11. The axial position of this sleeve 16 relative to the hollow cylinder 17 is determined by a restoring spring 75 which tends to hold an internal collar 76 of the sleeve 16 in contact with a shoulder 77 of the hollow cylinder 17. This spring 75 bears against a ring 78 which is pivotable through the intermediary of a ball bearing 79 acting as a thrust bearing, on a collar 80 clamped on the spindle 1.

When the operator has completed the work to be carried out by means of the tool carried in the tool-holder 30 fixed in the lower end of the spindle 1, he stops the driving motor of the spindle by operating a switch which is inserted in the supply circuit of this motor, and then causes the spindle to be lifted into the axial position shown in the drawings by actuating the shaft 8. In this upper position of rest of the spindle 1, the rear edge 81 of the sleeve 16 abuts against a stop ring 82 which is fixed rigidly on the rear end of the pulley 11.

In order to extract the tool-holder, the operator actuates the shaft 8, in order to cause the spindle to be displaced axially in the upward direction, beyond its upper rest position. The hollow cylinder 17 is drawn along in this axial movement of the spindle 1 by an internal collar 84 engaged in a groove 85 of the sleeve 22. Consequently, this axial movement of the spindle beyond its upper rest position causes:

(1) The disengagement of the teeth 18 and 19 from one another and therefore the interruption of the mechanical coupling connecting the spindle 1 to its driving motor;

(2) The engagement of the end 45 of the rod 31 in hole 46 of the sleeve 44 and therefore the establishment of a mechanical connection between this rod 31 and the driving element 53;

(3) The engagement of the two parts of a spindle locking device, constituted by internal teeth 86 of the hollow cylinder 17 and external teeth 87 of the support 47 which is retained in a fixed angular position by a finger 88 which engages into a slot 89.

When this operation is completed, the operator thereafter actuates the operating member of a control box 83 so as to supply current to the motor M whereas push button 68 is disconnected. This motor drives anticlockwise the driving element 53 through the worm wheel 54, the ring 61, the housings 63, the wedging members 62, and the plate 60.

Consequently, the spindle 1 is retained in a fixed angular position while the rod 31 is driven through the intermediary of the unidirectional drive coupling in a rotational movement from the left to the right which brings about the unscrewing of the rod 31, and therefore the extraction of the tool carrier 30. During this operation, the hollow cylinder 17 bears with its rear face against the stop ring 82, in order to prevent any upward movement of the spindle 1 and also the collar 41, abutting on the end 43 of the head 27, prevents any axial displacement of the rod 31 in the upward direction. Thus the tool-holder 30 is automatically withdrawn from the centering cone of the spindle 1.

When the holder 30 is completely disconnected from the rod 31, the operator actuates the operating member of the switch 83 in the opposite sense, so as to interrupt the supply of current to the motor M and to connect-in the push button once again, and then he actuates the shaft 8 in order to return the spindle into the upper rest position illustrated.

In order to clamp a tool in the spindle 1, the operator actuates the shaft 8 to lift the spindle into its uppermost position, in which the teeth 86 of the hollow cylinder are engaged in the teeth 87 of the support 47. Then he engages the tool-holder 30 inside the centering cone 28. When the shank of this tool-holder abuts on the end of the extensions 32 of the rod 31, the latter is pushed upwards to a position higher than that of the releasing position, spring 39 being thereby extended. The end 45 of this rod engaged in the sleeve 44 actuates a push member 90 which, through the intermediary of a lever 91, acts on the push button 68 and thus supplies current to the winding 70 of the contactor 67. The latter closes the circuit supplying the motor M and the timing relay 72 so as to drive clockwise the driving element 53 through the worm 55, the worm wheel 54, the ring 61, and the discs 57, 58 of the friction coupling. The sleeve 44 then drives the rod 31 rotationally and the threading of its extension 32 is screwed into the threading of the hole 33 formed in the shank of the tool-holder 30.

During the course of the operation of screwing the extension 32 into the tool-holder, the rod 31 moves downwards until its shoulder 34 bears against the inner shoulder 35 of the spindle. From this instant onwards, the screwing of the extension 32 into the tool-holder 30 causes the male cone 29 to be clamped within the centering cone 28. When the tool holder is clamped tightly in the spindle, the rod 31 cannot turn any longer, and the discs 57, 58 of the friction coupling which have until then stuck together begin to slip.

The downward movement of the rod 31 which is produced at the beginning of the operation of screwing the extension 32 into the tool-holder, causes the return of the push button 68 into the rest position (illustrated in the drawings). The exciting winding 70 however remains supplied by the contact stud 73, the bimetallic strip 72 and the contact stud 74 until the heating of the said bimetallic strip, owing to the current passing through it, causes the switch 72, 74 to open. The time necessary to bring about this opening is arranged to be longer than that required for clamping the male cone 29 within the centering cone 28.

Figure 3:
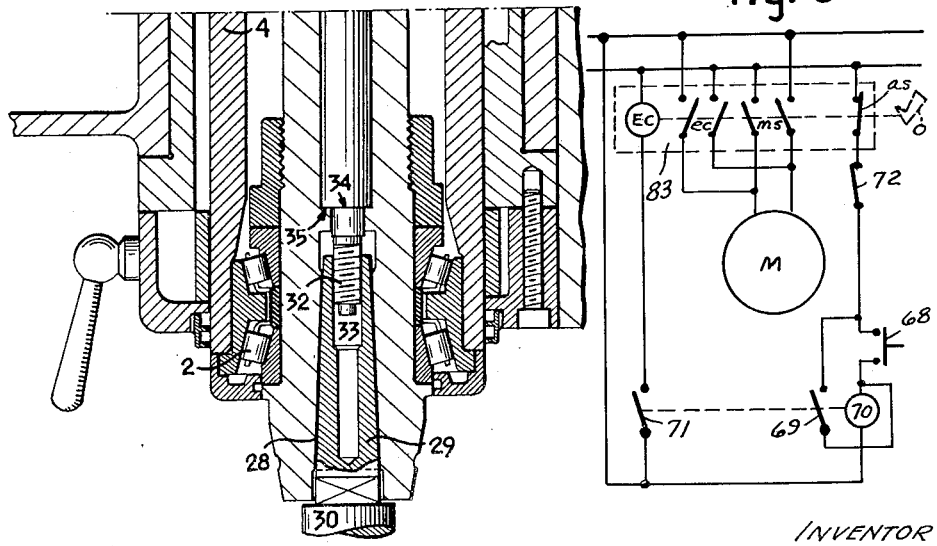
FIG. 3 is a schematic wiring diagram of the motor control circuit.

As shown in FIG. 3, the control device of motor M comprises, on the one hand, a control box 83 and, on the other hand, a push button 68 connected in series with a timing relay 72 in the feed circuit of the exciting winding 70 of a contactor 67. Said contactor has, on the one hand, a contact 69 connected in series in the feed circuit of the exciting winding 70 and, on the other hand, a contact 71 the closing of which causes the energization of motor M so as to set the driving member 46 rotating from the right to the left to effect the clamping of the tool.

The control box 83 comprises a main switch *ms* controlled by an operating member O and enabling motor M to be energized, so as to drive the drving member 46 from the left to the right, to effect removal of the tool, and, or the other hand, to permit operation of an electrical solenoid EC having a pair of open switches ec.

Said control box 83 comprises, further, an auxiliary switch *as,* the contacts of which are in open position when the operating member O of said control box 83 and hence the contacts *ms* are in their closed position for which the motor is energized to drive the driving member 46 from the left to the right in order to effect removal of the tool. On the contrary, for the open position of the operating member O of said control box 83, the auxiliary switch *as* is closed. Said auxiliary switch *as* is connected in series with the exciting winding 70 of said contactor 67 so that the feeding of said exciting winding 70 is automatically cut out when the motor M is energized to effect removal of the tool.

When the operating member of the control box 83 is placed in open or rest position, i.e. when the supply current to motor M is cut out, the push button 68 is thus connected to the mains. Thus when the operator, after having moved the spindle upwards up to its uppermost position beyond its rest position, engages a tool or tool holder in the cone of the spindle, the shank of the tool acts upon the clamping rod 31 and pushes said clamping rod upwards which causes by the intermediary of the push member 90 and lever 91 the closing of the push button 68. In consequence, the exciting winding 70 is energized which causes the closing of the contacts 69 and 71 of the contactor 67.

The contact 69 is a holding contact which ensures energization of the winding 70 even if the contact of the push button is opened.

The contact 71 is connected in the feed circuit of motor M and its closing energizes said motor in the reverse direction, i.e. so as to rotate the driving member 46 from the right to the left in order to effect clamping of the tool in the spindle. It is clear that said contact 71 may be directly connected in the feed circuit of the motor or, in a preferred embodiment, in the exciting circuit EC of a contactor the pair of switches *ec* of which are connected in the feed circuit of said motor M and disposed in the control box 83.

The stopping of motor M is controlled, after clamping of the tool in the spindle, by the timing relay 72 constituted in the illustrated embodiment by a bimetallic blade heated by the feed current of the exciting winding 70. Thus, after a predetermined time, the contact 72 opens, the relay 67 comes back under the action of a spring in the illustrated position (FIG. 1), and the motor stops. It is clear that the heating time of the bimetallic blade 72 necessary to cause the opening of the contact 72 has to be longer than the time required for the clamping of the tool. After the clamping of the tool, the operator moves the spindle downwards from its uppermost position, which causes the automatic opening of the contact of the push button 68 under the action of the spring of said latter. In consequence, when the bimetallic blade reaches the opening temperature, the contact 72 opens and deenergizes the feeding circuit of the winding 70, which causes the opening of the contact 71 and hence the stopping of said motor M.

When the shank of the tool holder is engaged within the clamping cone of the spindle and during the whole duration of the clamping operation, the operator can hold the tool in both hands and can concentrate all his attention on keeping the tool-holder in the correct position in the spindle, since the starting of the motor M and therefore the driving of the rod 31 is brought about by an axial displacement of the said rod 31 which is pushed upwards by the shank of the tool-holder. This actuating rod 31 therefore also constitutes a control member for automatically bringing the motor M into action.

I claim:

1. In a machine tool comprising a tool-holder spindle having a centering cone and an axial bore, driving means to drive said spindle, means to connect said driving means to said spindle, means to move axially said spindle beyond its upper rest position into an upper lock position in which said spindle is released from said spindle-driving means, means for clamping into position and extracting a tool holder in said lock position of the spindle comprising a clamping rod positioned in said bore for axial and angular movements relative to said spindle, reversible driving means adapted to drive said clamping rod in either direction, locking means maintaining said spindle in a fixed angular position, spindle-disconnecting means disconnecting said spindle from its driving means when said spindle is in its locking position, connecting means connecting said clamping rod to its driving means, and control means controlling the automatic starting and stopping of said clamping rod driving means.

2. In a machine tool comprising a tool-holder spindle having a centering cone and an axial bore, driving means to drive said spindle, means to connect said driving means to said spindle, means for clamping into position and extracting a tool holder comprising a clamping rod positioned in said bore for axial and angular movements relative to said spindle, reversible driving means adapted to drive said clamping rod in either direction, the combination of spindle-disconnecting means, spindle locking means, connecting means adapted to connect said clamping rod to its reversible driving means, and of control means controlling the starting and stopping of said clamping rod driving means, means supporting said spindle for axial movement, means defining an upper rest position for said spindle, and means to move said spindle beyond said rest position into an upper lock position to be effected on the one hand by means of said spindle-disconnecting means for disconnection of said spindle from its driving means and the locking of said spindle by said spindle-locking means against rotation and, on the other hand, the connection by means of said connecting means of said clamping rod driving means to said clamping rod; said control means being responsive, on the one hand, to axial movement of said clamping rod upon engagement of said tool holder in said centering cone to start said clamping rod driving means and to cause thereby the automatic clamping of said tool holder and, on the other hand, to the running time of said clamping rod driving means to cause thereby the automatic stopping of said driving means after a predetermined running time.

3. In a machine tool comprising a tool-holder spindle having a centering cone and an axial bore, driving means to drive said spindle, means to connect said driving means to said spindle, means to move axially said spindle beyond an upper rest position into an upper lock position in which said spindle is released from said spindle-driving means, means for clamping into position and extracting a tool holder in said lock position of the spindle comprising a clamping rod positioned in said bore for axial and angular movements relative to said spindle, reversible driving means adapted to drive said clamping rod in either direction, the combination of locking means maintaining said spindle in a fixed angular position, spindle-disconnecting means disconnecting said spindle from its driving means when said spindle is in its locking position, connecting means connecting said clamping rod to its driving means, and of control means controlling the automatic starting and stopping of said clamping rod driving means; said means connecting said driving means to said spindle comprising a first driving member, means for coupling said spindle to said first driving member in any position thereof equal or lower than said rest position, said means for connecting said clamping rod to its reversible driving means comprising a second driving member, and means for coupling said clamping rod to said second driving member in said upper lock position of the spindle beyond said rest position; said control means being responsive, on the one hand, to axial movement of said clamping rod upon engagement of said tool holder in said centering cone to start said clamping rod driving means and to cause thereby the automatic clamping of said tool holder and, on the other hand, to the running time of said clamping rod driving means to cause thereby the automatic stopping of said driving means after a predetermined running time.

4. In a machine tool comprising a tool-holder spindle having a centering cone and an axial bore, driving means to drive said spindle, means to connect said driving means to said spindle, means to move axially said spindle beyond an upper rest position into an upper lock position in which said spindle is released from said spindle-driving means, means for clamping into position and extracting a tool or tool holder in said lock position of the spindle comprising a clamping rod positioned in said bore for axial and angular movements relative to said spindle, reversible driving means adapted to drive said clamping rod in either direction, the combination of locking means maintaining said spindle in a fixed angular position, spindle-disconnecting means disconnecting said spindle from its driving means when said spindle is in its lock position, connecting means connecting said clamping rod to its driving means, and control means controlling the automatic starting and stopping of said clamping rod driving means; said means connecting said driving means to said spindle comprising a first driving member, means for coupling said spindle to said first driving member in any position thereof equal or lower than said rest position, said means for connecting said clamping rod to its reversible driving means comprising a second driving member and a friction coupling, and means for coupling said clamping rod to said second driving member in said upper lock position of the spindle beyond said rest position, whereby only a torque of limited value may be transmitted to said clamping rod; said control means being responsive, on the one hand, to axial movement of said clamping rod upon engagement of a tool or tool holder in said centering cone to start said clamping rod driving means and to cause thereby the automatic clamping of said tool or tool holder and, on the other hand, to the running time of said clamping rod driving means to cause thereby the automatic stopping of said driving means after a predetermined running time.

5. In a machine tool comprising a tool-holder spindle having a centering cone and an axial bore, driving means to drive said spindle, means to connect said driving means to said spindle, means for clamping into position and extracting a tool or tool holder comprising a clamping rod positioned in said bore for axial and angular movements relative to said spindle, reversible driving means adapted to drive said clamping rod in either direction, the combination of spindle-disconnecting means, spindle-locking means, connecting means adapted to connect said clamping rod to its reversible driving means, and control means controlling the starting and stopping of said clamping rod driving means, means supporting said spindle for axial movement, means defining an upper rest position for said spindle, means to move said spindle beyond said rest position into an upper lock position to cause, on the one hand, by means of said spindle-disconnecting means the disconnection of said spindle from its driving means and the locking of said spindle by said spindle-locking means against rotation and, on the other hand, the connection by means of said connecting means of said clamping rod driving means to said clamping rod; said means connecting said driving means to said spindle comprising a first driving member, means for coupling said spindle to said first driving member in any position thereof equal or lower than said rest position, said means for connecting said clamping rod to its reversible driving means comprising a second driving member and a friction coupling, and means for coupling said clamping rod to said second driving member in said upper lock position of the spindle beyond said rest position, whereby only a torque of limited value may be transmitted to said clamping rod; said control means being responsive, on the one hand, to axial movement of said clamping rod upon engagement of a tool or tool holder in said centering cone to start said clamping rod driving means and to cause thereby the automatic clamping of said tool or tool holder and, on the other hand, to the running time of said clamping rod driving means to cause thereby the automatic stopping of said driving means after a predetermined running time.

References Cited in the file of this patent
UNITED STATES PATENTS

| | | |
|---|---|---|
| 2,026,448 | Turrettini | Dec. 31, 1935 |
| 2,667,820 | De Vlieg | Feb. 2, 1954 |
| 2,769,053 | Weinfurt | Oct. 30, 1956 |